United States Patent

Kovalenko et al.

[11] 3,927,849
[45] Dec. 23, 1975

[54] FLUIDIC ANALOG RING POSITION DEVICE

[75] Inventors: Gerald E. Kovalenko; Charles E. Woods, both of China Lake, Calif.

[73] Assignee: The United States of America as represented by the Secretary of the Navy, Washington, D.C.

[22] Filed: Nov. 17, 1969

[21] Appl. No.: 882,409

[52] U.S. Cl. ............... 244/3.22; 137/804; 73/37.5
[51] Int. Cl.² ............................................ F41G 7/00
[58] Field of Search ........ 137/81.5, 15.1, 15.2, 805, 137/804; 244/3.22; 102/92.1; 73/515, 516, 37, 37.5

[56] References Cited
UNITED STATES PATENTS

| 3,205,715 | 9/1965  | Meek ............................ 137/81.5 |
| 3,444,814 | 5/1969  | Warren .......................... 137/81.5 |
| 3,502,285 | 3/1970  | Gambill ......................... 244/3.22 |
| 3,537,466 | 11/1970 | Chapin et al. .................. 137/81.5 |
| 3,541,839 | 11/1970 | Weber et al .................... 137/81.5 |

Primary Examiner—Samuel Feinberg
Attorney, Agent, or Firm—R. S. Sciascia; Roy Miller

[57] ABSTRACT

A position sensor for measuring differential pressure comprising a ring longitudinally restrained on a cylindrical body in proximity to a pair of exit ports diametrically opposed on said cylindrical body; and in communication with a central bore portion in said body and a pressure differential measuring means in communication with said exit ports.

3 Claims, 2 Drawing Figures

INVENTORS
GERALD E. KOVALENKO
CHARLES E. WOODS
BY
Roy Miller
ATTORNEYS

FLUIDIC ANALOG RING POSITION DEVICE

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a ring position sensor which was developed to measure ring-switch position during flight of a projectile.

BRIEF DESCRIPTION OF THE PREFERRED EMBODIMENT

Figure 1:
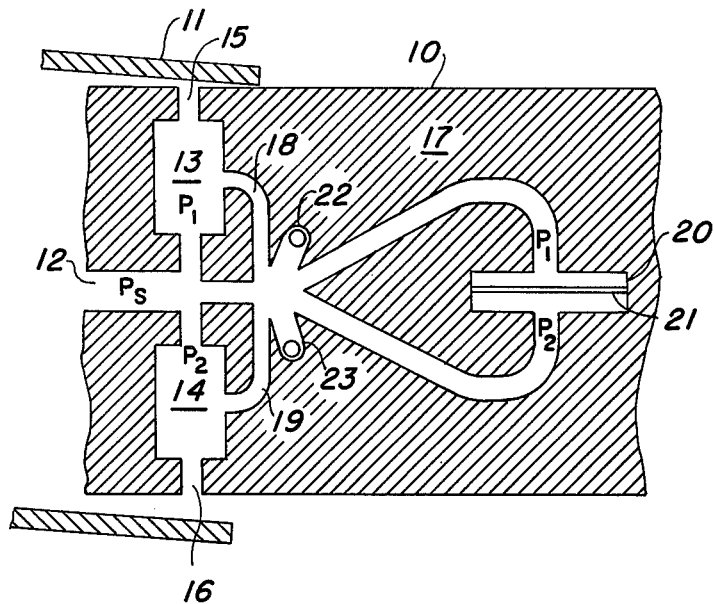
FIG. 1 is a cutaway showing one embodiment of the fluidic analog ring position device.

Projectile body 10 of FIG. 1 has a ring 11 completely surrounding the body. Centrally located in the forward portion of the projectile is a central passageway 12 in communication with outside pressure. The central passageway 12 extends toward the rear of the projectile and branches into a first pressure chamber 13 and second pressure chamber 14, diametrically opposed, which terminate in exit ports 15 and 16 in communication with outside atmosphere.

Central passageway 12 extends past the branching ducts to pressure chambers 13 and 14 and forms the one portion of a fluid amplifier amplifier indicated at 17 having control ports 18 and 19 in communication with the pressure chambers 13 and 14, respectively.

In this embodiment the two branches of the fluidic amplifier terminate in a central area 20 and the two branches are separated by strain gaged diaphragm 21. Ports 22 and 23 are vented to the atmosphere to provide for fluid flow.

In operation, when a projectile is fired from a gun, the ring 11 is gyro stabilized with respect to body 10. When the ring 11 is in stabilized position with respect to the body 10 the fluid flow through the central chamber 12 is distributed in pressure chambers 13 and 14 equally so that there is no pressure differential. When projectile 10 interrupts a shock wave or a shock wave impinges on the ring 11 the ring tilts thereby decreasing the flow through one of the respective exit ports 15 and 16. This causes a pressure unbalance in $P_1$ and $P_2$ which is detected and measured by strain gage diaphragm 21.

Figure 2:
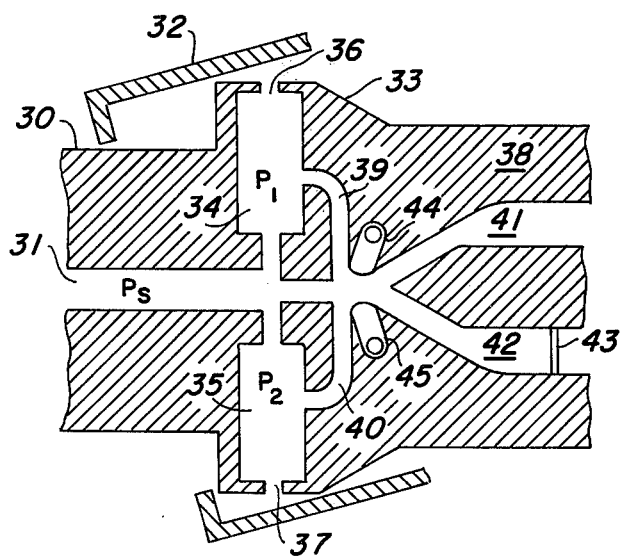
FIG. 2 is another cutaway of the fluidic analog ring position device illustrating an alternate location of the position sensor.

In the embodiment of FIG. 2, an alternate location of the position sensor is shown, however, basically the equipment operates in the same fashion as that illustrated in FIG. 1. Again, there is the main body of the projectile 30 having a central passageway 31 therethrough. Cylindrical ring 32 which entirely surrounds the projectile body 30 is positioned and restrained by retaining shoulder 33. Central passageway 31 branches to pressure chambers 34 and 35 which terminate in exit ports 36 and 37, respectively. Central passageway 31 extends on and is the source to a fluid amplifier indicated at 38. Passageways 39 and 40 from pressure chambers 34 and 35, respectively, are used as the control ports to the fluid amplifier 38 for detecting and introducing the fluid imbalance in the pressure chambers 34, 35 to the fluid amplifier. The two passages 41 and 42 of the fluid amplifier are vented to atmosphere and a hot wire anemometer 43 is positioned in one of the passageways as shown.

Ports 44 and 45 are in this case closed due to the fact that the passageways 41 and 42 are vented to atmosphere and no additional venting is needed.

The operation of the ring switch with respect to the projectile body is such that the ring tilts when it encounters a shock wave thereby disturbing the pressure balance between pressure chambers 34 and 35, respectively. The control passageways 39 and 40 convey the pressure imbalance to divert the power source into either passageway 41 or 42 or deflect a portion of the power source. The differential pressure will be measured by the hot wire anemometer 43 and such pressure difference conducted to an amplifier and telemetry unit, not shown.

What is claimed is:

1. A position sensor for sensing the position of a body encircling member with respect to a body comprising;
    a longitudinal body in the form of a cylindrical projectile;
    said body having a central passageway therethrough;
    at least one pair of exit ports in communication with and at right angles to said central passageway and spaced longitudinally from one end of said body;
    a body encircling member comprising a ring longitudinally restrained on said longitudinal body in proximity to said exit ports;
    indicator means connected to said exit ports for indicating an unbalance of fluid pressure between said ports;
    said position sensor being arranged and operated such that fluid will flow through said central passageway under pressure and a portion thereof be metered through said exit ports;
    said ring being adapted and arranged so that the proximity to said exit ports may vary under outside influence thereby varying the amount of fluid metered through said ports.

2. A position sensor as set forth in claim 1 wherein;
    said indicator means comprises a strain gage and meter means downstream from said exit ports for measuring the differential pressure therebetween.

3. A position sensor as set forth in claim 2 and further including;
    fluid amplifier means operatively connected to said exit ports and strain gage and meter means operatively connected to said fluid amplifier means for measuring differential pressure between said exit ports.

* * * * *